(12) United States Patent
Bertovic (10) Patent No.: US 10,247,222 B2
(45) Date of Patent: Apr. 2, 2019

(54) FASTENER SYSTEM WITH FASTENER EXTENSION AND DRIVING TOOL

(71) Applicant: INTER-JOIN PTY/LTD., Abbotsbury NSW (AU)

(72) Inventor: Tomo Zvonko Bertovic, Abbotsbury (AU)

(73) Assignee: INTER-JOIN PTY LTD., Abbotsbury, New South Wales (AU)

( * ) Notice: Subject to any disclaimer, the term of this patent is extended or adjusted under 35 U.S.C. 154(b) by 81 days.

(21) Appl. No.: 14/710,905

(22) Filed: May 13, 2015

(65) Prior Publication Data

US 2015/0240858 A1 Aug. 27, 2015

Related U.S. Application Data

(63) Continuation-in-part of application No. PCT/AU2013/001315, filed on Nov. 13, 2013.

(51) Int. Cl.
| | |
|---|---|
| *F16B 35/06* | (2006.01) |
| *F16B 23/00* | (2006.01) |
| *B25B 13/50* | (2006.01) |
| *F16B 15/00* | (2006.01) |

(52) U.S. Cl.
CPC ............. *F16B 35/06* (2013.01); *B25B 13/50* (2013.01); *F16B 23/0069* (2013.01); *F16B 15/0007* (2013.01)

(58) Field of Classification Search
CPC ......... F16B 15/0007; F16B 35/06; F16B 5/02
USPC .................... 411/458, 459, 388, 389, 546
See application file for complete search history.

(56) References Cited

U.S. PATENT DOCUMENTS

| | | | | |
|---|---|---|---|---|
| 321,389 | A | * | 6/1885 | Schirmer ............. F16B 35/042 16/4 |
| 1,018,490 | A | * | 2/1912 | Hall ..................... E04B 1/4121 411/389 |
| 1,150,358 | A | * | 8/1915 | Gilmer ..................... E04B 1/49 403/280 |
| 1,297,523 | A | * | 3/1919 | With ................... F16B 15/0046 411/458 |
| 1,767,565 | A | * | 6/1930 | Thrift .................... E04F 13/045 411/475 |
| 2,161,740 | A | * | 6/1939 | Eksergian .............. B60B 11/06 301/35.622 |
| 2,741,289 | A | * | 4/1956 | Grow .................... F16B 39/282 411/185 |

(Continued)

FOREIGN PATENT DOCUMENTS

| | | |
|---|---|---|
| DE | 29819228 U1 | 1/1999 |
| GB | 106318 A | 5/1917 |

*Primary Examiner* — Flemming Saether
(74) *Attorney, Agent, or Firm* — Craft Chu PLLC; Andrew W. Chu (57) ABSTRACT

A fastener includes a shank having a first attachment device for attachment to a first workpiece and a head having a second attachment device for attachment to a second workpiece. The fastener can be a screw and the first attachment device includes a thread formation on the shank. The head includes a drive formation at a central portion thereof, in the form of a Phillips head screwdriver recess. The second attachment device in the head includes attachment members integrally formed in the head, being three prongs which extend in a generally opposite direction to the shank.

11 Claims, 6 Drawing Sheets

(56) References Cited

U.S. PATENT DOCUMENTS

| | | | | |
|---|---|---|---|---|
| 3,850,501 A * | 11/1974 | Butterfield | H01B 17/58 | 439/196 |
| 4,509,767 A * | 4/1985 | Brilando | B62J 99/00 | 280/288.4 |
| 4,533,288 A * | 8/1985 | Rivkin | F16B 15/04 | 411/176 |
| 4,540,322 A * | 9/1985 | Coffia | F16B 41/005 | 411/338 |
| 4,673,240 A * | 6/1987 | Byfield, Jr. | H01M 2/305 | 411/378 |
| 5,840,078 A * | 11/1998 | Yerys | A61B 17/17 | 24/453 |
| 6,647,608 B2 * | 11/2003 | Wojciechowski | B23P 19/062 | 29/509 |
| 6,668,501 B2 * | 12/2003 | Adebar | E04F 13/045 | 411/155 |
| 7,568,871 B2 * | 8/2009 | Chopp, Jr. | H01R 4/64 | 411/107 |
| 8,066,464 B1 * | 11/2011 | Van Dyke | E04F 15/04 | 411/458 |
| 8,636,457 B2 * | 1/2014 | Connors | F16B 5/0275 | 411/388 |
| 8,920,091 B2 * | 12/2014 | Heinrich | F16B 5/0275 | 411/367 |
| 2004/0106309 A1 * | 6/2004 | Larsson | H01R 4/66 | 439/92 |
| 2016/0091006 A1 * | 3/2016 | Lai | F16B 5/02 | 411/172 |

* cited by examiner

FASTENER SYSTEM WITH FASTENER EXTENSION AND DRIVING TOOL

RELATED U.S. APPLICATIONS

The present application is a continuation-in-part application under 35 U.S. Code Section 120 and Section 365 (c) of International application PCT/AU13/01315 with an international filing date of 13 Nov. 2013, and entitled "FASTENER", presently pending.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a fastener and in particular to a fastener for wood products, and the like.

The invention has been developed primarily for the carpentry and building industries and will be described hereinafter with reference to this application. However, it will be appreciated that the invention is not limited to this particular field of use.

2. Description of Related Art Including Information Disclosed Under 37 CFR 1.97 and 37 CFR 1.98.

Fasteners such as screws, nails and anchor bolts have been manufactured with a variety of heads and drive designs, each requiring a different kind of tool to drive or extract them. All fasteners employ the same general fixing principle, with the shank, which may be threaded or serrated, providing gripping and the head providing a bearing surface and means to drive the screw.

One difficulty with such fasteners is the head by design is left exposed. In building applications, this leads to additional finishing work for the builder to finish the workpiece around the head.

There is thus a need for a fastener which provides concealed fixing, in that the workpiece can be fixed in place as desired with the fastener concealed. This will allow builders to use pre-finished workpieces with further finishing work not being required.

The inventor performed a comprehensive search of the market place and published patent publications and did not find a product which satisfies the inventor's requirements.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention provides a fastener comprising:
  a shank having a first attachment means for attachment to a first workpiece; and
  a head having a second attachment means for attachment to a second workpiece Preferably, the fastener is a screw and the first means comprises a thread formation on the shank.

Alternatively, the fastener is a nail.

Alternatively, the fastener is an anchor bolt.

Preferably, the second attachment means comprises at least one attachment member formed in the head, the at least one attachment member extending in a generally opposite direction to the shank.

Preferably, each of the at least one attachment member is a prong.

Preferably, the head comprises a drive formation at a central portion thereof and the at least one attachment member is formed laterally of the drive formation.

Preferably, the at least one attachment member extends from a peripheral portion of the head.

Preferably, the at least one attachment member comprises a plurality of attachment members substantially equidistantly spaced around a peripheral portion of the head.

Preferably, the fastener comprises three or more attachment members.

Preferably, the plurality of attachment members comprises prongs which are slightly splayed relative to each other.

Preferably, each prong has an end portion with a point, wherein the prong is adapted to embed into the second workpiece when the second workpiece is forced against the second attachment means.

Preferably, each prong is adapted to substantially curl and/or skew into the second workpiece as the second workpiece is forced against the second attachment means.

Preferably, the plurality of attachment members comprises prongs having serrations formed thereon.

Preferably, the prongs extend parallel to each other in a direction opposite to the shank.

Preferably, the prongs are integrally formed with the head.

In one embodiment, the prongs comprise a distal pointed portion with no serrations and a proximal portion with serrations.

Alternatively, the prongs are slightly splayed relative to each other.

In this embodiment, preferably, each prong is adapted to substantially curl and/or skew into the second workpiece as the second workpiece is forced against the second attachment means.

Preferably, the fastener comprises a depth measuring means for indicating the depth of insertion of the first attachment means and/or the distance of the head from the first workpiece in use.

Preferably, the depth measuring means comprises a shoulder formed at the junction of the head and the shank.

In another aspect, the present invention provides a fastener comprising:
  a shank having a first attachment means for attachment to a first workpiece; and
  a head having a second attachment means for attachment to a second workpiece;
  wherein the fastener comprises a depth measuring means for indicating the depth of insertion of the first attachment means and/or the distance of the head from the first workpiece in use.

Preferably, the depth measuring means comprises a shoulder formed at the junction of the head and the shank.

Preferably, the shoulder is cylindrical and comprises a diameter larger than the shank, and forms a stop surface with the shank.

Preferably, the stop surface is spaced from the head.

Preferably, the fastener is a screw and the first means comprises a thread formation on the shank.

Preferably, the second attachment means comprises at least one attachment member formed in the head, the at least one attachment member extending in a generally opposite direction to the shank.

Preferably, the head comprises a drive formation at a central portion thereof and the at least one attachment member is formed laterally of the drive formation.

Preferably, the at least one attachment member comprises a plurality of attachment members substantially equidistantly spaced around a peripheral portion of the head.

Preferably, the plurality of attachment members comprises prongs which are slightly splayed relative to each other.

Preferably, each prong is adapted to substantially curl and/or skew into the second workpiece as the second workpiece is forced against the second attachment means.

In another aspect, the present invention provides a fastener extension for a fastener having a fastener head, the fastener extension comprising:
 a body having a central aperture through which the fastener can extend through,
 the aperture being shaped for receiving the fastener head in a tight fit therewith, and
 an attachment means formed in the body and extending opposite to the fastener in use.

Preferably, the body is shaped as a washer.

Preferably, the body comprises a head section and a generally cylindrical shoulder extending from the head and opposite to the attachment means.

Preferably, the shoulder defines a stop surface spaced from the head.

Preferably, the attachment means are prongs.

Preferably, the fastener extension further comprises a drive tool for the fastener extension, the drive tool comprising a corresponding formation for receiving the attachment means of the fastener extension.

Preferably, the attachment means are prongs and the drive tool comprises cavities for receiving the prongs.

Other aspects of the invention are also disclosed.

BRIEF DESCRIPTION OF THE DRAWINGS

Notwithstanding any other forms which may fall within the scope of the present invention, preferred embodiments of the present invention will now be described, by way of examples only, with reference to the accompanying drawings.

FIGS. 1(a), 1(b), and 1(c) show a screw fastener in accordance with a preferred embodiment of the present invention with three integral fixing prongs, where

FIGS. 2(a), 2(b), and 2(c) show a screw fastener in accordance with another preferred embodiment of the present invention with four integral fixing prongs, where

FIGS. 4a, 4b, 4c, and 4d schematically show the fastener of FIG. 1(a).

FIGS. 5(a), 5(b), and 5(c) show screw fasteners in accordance with other preferred embodiments with three integral fixing prongs, where

FIGS. 6(a-i) show fastener extensions in accordance with another aspect of the invention, where FIG. 6(b) is a side elevation view of FIG. 6(a), and FIG. 6(c) is a top plan view of FIG. 6(a). FIG. 6(d) is a perspective view of a second fastener extension. FIG. 6(e) is a side elevation view of FIG. 6(d), and FIG. 6(c) is also a top view of FIG. 6(d). FIG. 6(f) is a perspective view of a third fastener extension. FIG. 6(g) is a side elevation view of FIG. 6(f), and FIG. 6(h) is a top plan view of FIG. 6(f). FIG. 6(i) is a perspective view of a fourth fastener extension. FIG. 6(j) is a side elevation view of FIG. 6(i), and FIG. 6(h) is a top plan view of FIG. 6 (i).

DETAILED DESCRIPTION OF THE DRAWINGS

It should be noted in the following description that like or the same reference numerals in different embodiments denote the same or similar features.

Figure 1A:
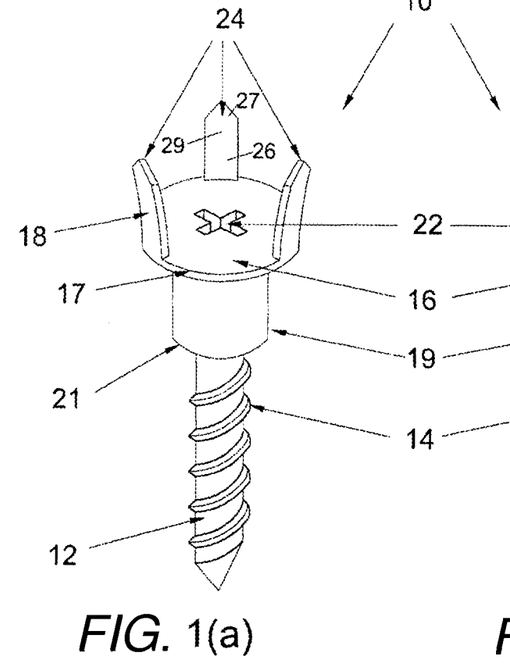
FIG. 1(a) is a perspective view showing the prongs slightly splayed in their initial configuration.
Figure 1B:
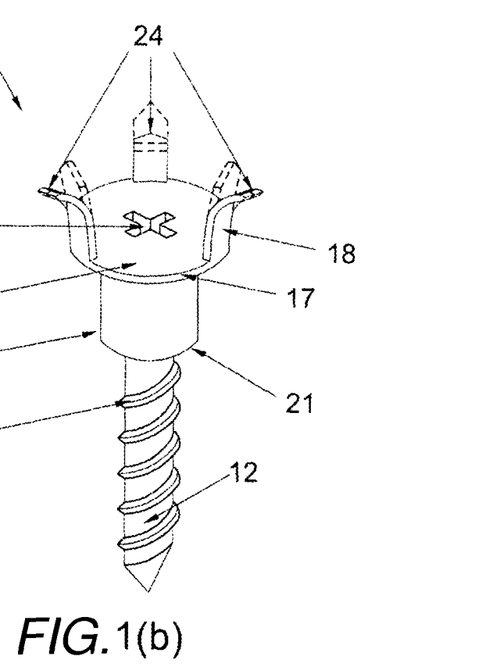
FIG. 1(b) is a perspective view showing the screw with the three prongs being in a curled and outwardly skewed configuration when embedded into a workpiece.
Figure 1C:
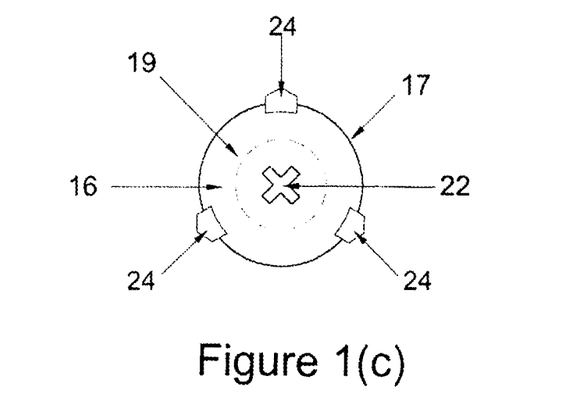
FIG. 1(c) is a top plan view of FIG. 1(a).
Figures 2A, 2B:
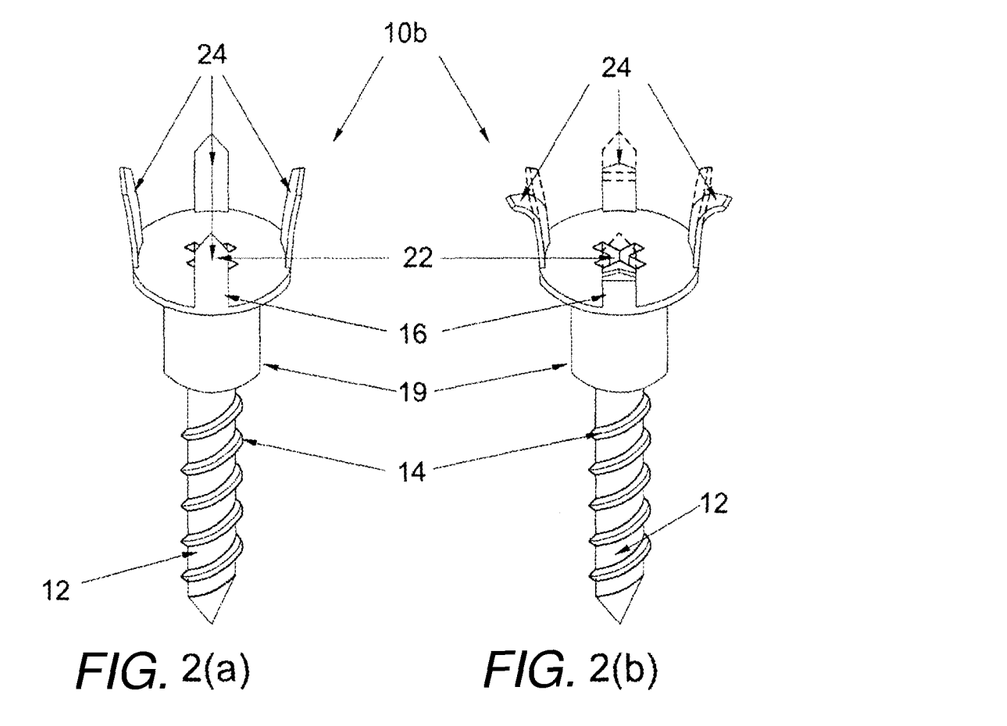
FIG. 2(a) is a perspective view showing the prongs slightly splayed in their initial configuration.
FIG. 2(b) is a perspective view showing the screw with the four prongs being in a curled and outwardly skewed configuration when embedded into a workpiece.
Figure 2C:
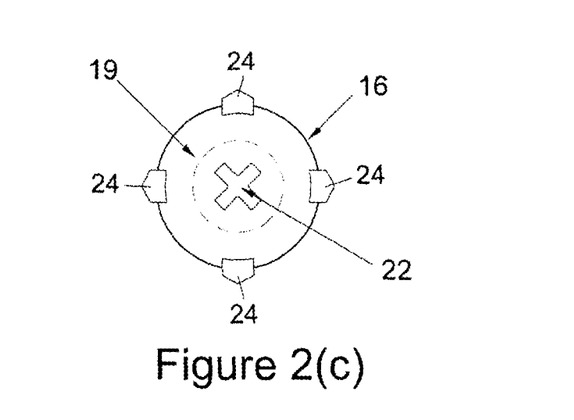
FIG. 2(c) is a top plan view of FIG. 2(a).
Figures 3A, 3B:
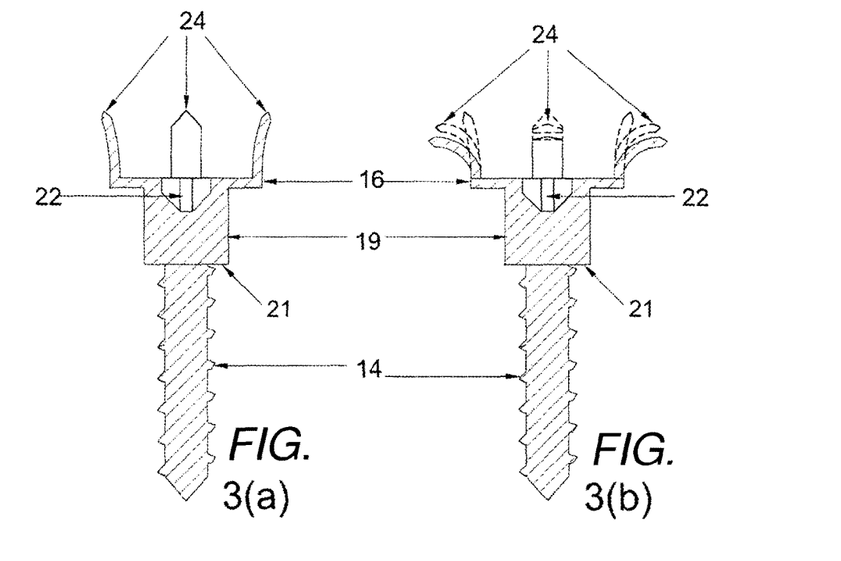
FIG. 3(a) is a schematic cross-section view of the FIG. 1(a).
FIG. 3(b) is a schematic cross-section view of the FIG. 1(b).
Figure 3C:
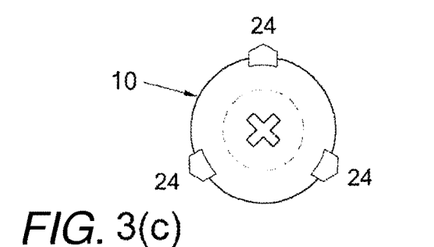
FIG. 3(c) is a top plan view of the fastener with three prongs.
Figure 3D:
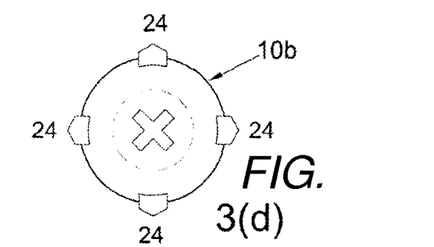
FIG. 3(d) is a top view of the fastener with four prongs.
Figure 3E:
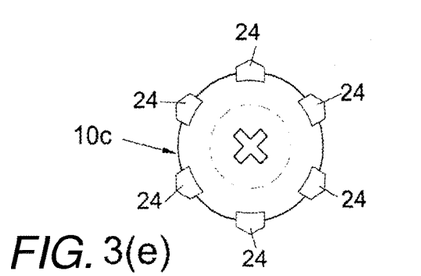
FIG. 3(e) is a top plan view of a fastener with six prongs.
Figure 3F:
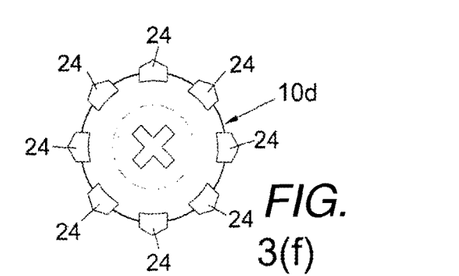
FIG. 3(f) is a top plan view of a fastener with eight prongs.

FIGS. 1, 3(a) and 3(b) show a fastener 10 in accordance with a preferred embodiment of the present invention. The fastener comprises a shank 12 having a first attachment means 14 for attachment to a first workpiece and a head 16 having a second attachment means 18 for attachment to a second workpiece. The fastener 10 is a screw and the first attachment means 14 comprises a thread formation on the shank 12.

The head 16 comprises a drive formation 22 at a central portion thereof, in the form of a Phillips head screwdriver recess.

The second attachment means 18 in the head 16 comprises attachment members 24 integrally formed in the head, being three prongs 24 which extend in a generally opposite direction to the shank 12. The prongs 24 are formed laterally of the drive formation 22, being equidistantly spaced around the peripheral portion 17 of the head 16.

The prongs 24 include a generally flattened rectangular portion 26 and a pointed end 27 at the end portion 29 thereof. The prongs 24 are slightly splayed relative to each other in their initial configuration.

The screw 10 also comprises a cylindrical shoulder 19 formed at the junction of the head 16 and the shank 12. The cylindrical shoulder 19 comprises a diameter larger than the shank 12 and thus forms a stop surface 21 with the shank 12. The stop surface 21 is thus spaced from the head 16. In use, the shank 12 can be inserted into a first workpiece and will stop at the stop surface 21. Thus, the shoulder 19 acts a depth measuring means in that the distance of the head 16 from the first workpiece for all of the fasteners 10 will be consistent.

Figure 4A:
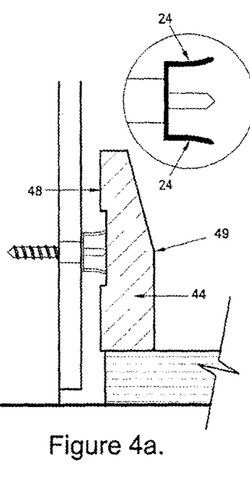
FIGS. 4a, 4b and 4c are schematic views showing the progressive engagement of a pre-finished timber workpiece via the skewing and curling of the integral fixing prongs.
Figure 4B:
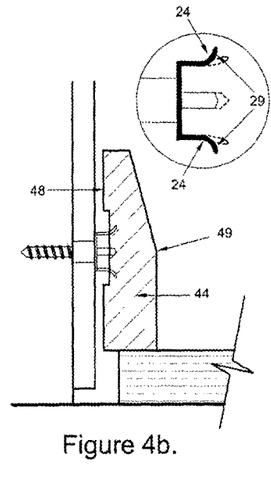
Figure 4C:
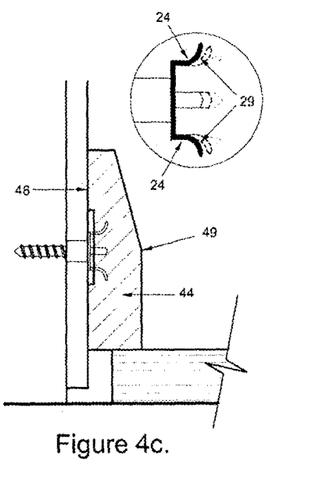
Figure 4D:
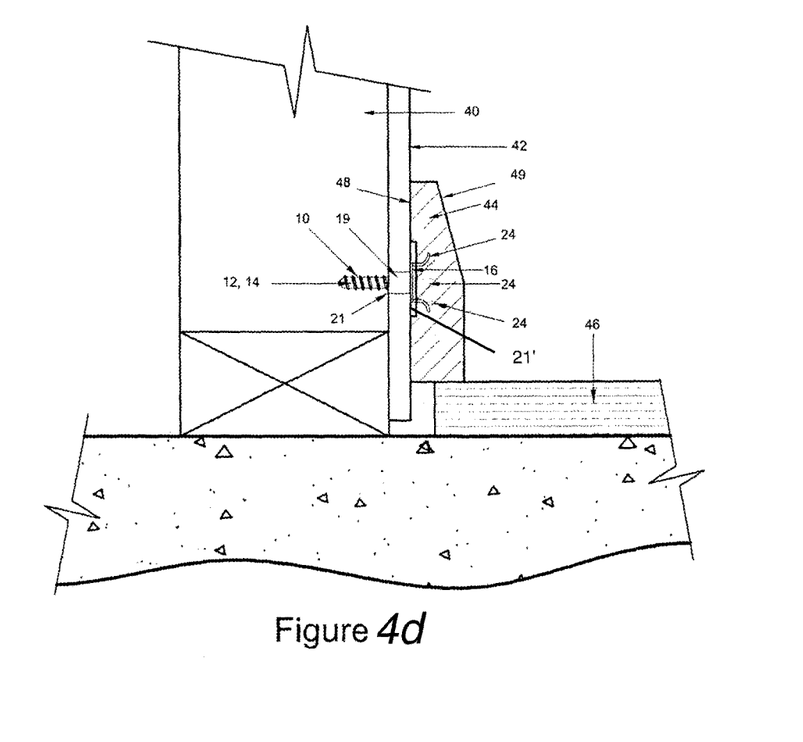
FIG. 4d is a schematic view of the fastener in use.

FIG. 4d schematically shows the fastener 10 in use. In this example, the fastener 10 is used for fixing a plasterboard wall lining 42 to a frame stud 40, and also for fixing a pre-finished timber skirting 44 to the wall lining 42 to cover the gap 43 between the wall lining 42 and the flooring 46.

The wall lining 42 has already been painted its final coat and is fixed to the first workpiece or frame stud 40 (timber, metal or masonry) via the threaded shank 12, up until the first stop surface 21 engages the frame stud 40. The head 16 engages the third workpiece or wall lining 42 providing a clamping force thereto towards the frame stud 40, with the prongs 24 extending outwardly. The second workpiece or timber skirting 44 is then forced into the second attachment means 18, being the prongs 24. The face of the head 16 provides a second stop surface 21' to control/prevent flex of the skirting 44.

FIGS. 4a, 4b & 4c schematically show the progressive engagement of the timber skirting 44 via the fixing prongs 24, which skew away from each other and the end portions 29 curl outwardly as the skirting 44 is forced into the second attachment means 18. FIG. 4a shows the skirting 44 initially engaging the prongs 24, with the integral fixing prongs 24 in the set position ready for engagement. FIG. 4b, shows the skirting 44 partly engaged with the integral fixing prongs 24 providing initial bite and commencing the skewing into the pre-finished timber. FIG. 4c shows the skirting 44 fully engaged in the final position, with the integral fixing prongs 24 completely skewed and curled to lock into the pre-finished timber.

Only the back surface 48 of the skirting 44 is engaged by the prongs 24 and the front pre-finished surface 49 is left unmarked. Thus, the fastener 10 provides concealed fixing of the skirting 44 and no further finishing is needed.

The fastener 10 can be embodied in other forms and can include less or more for different types of prongs 24 or attachment means 18.

FIGS. 2a-c and 3 (d) show a fastener 10b with four prongs 24. FIG. 3 (e) shows a fastener 10c with six prongs 24, and FIG. 3 (d) shows a fastener 10d with eight prongs 24. In the embodiment, the prongs 24 are equidistantly spaced around the periphery 17 of the head 16.

Figure 5A:
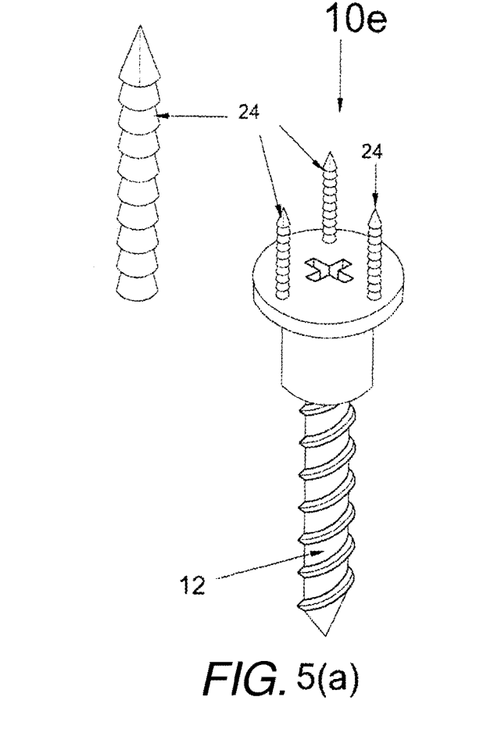
FIG. 5(a) is a perspective view showing one type of serrated prongs.
Figure 5B:
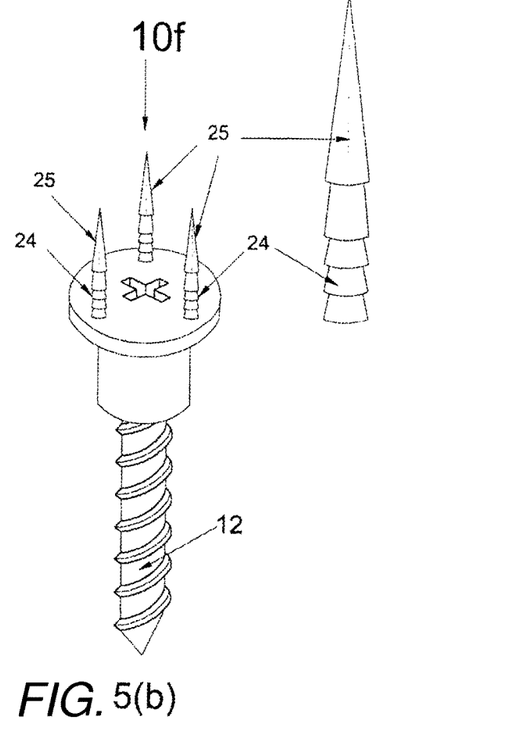
FIG. 5(b) shows a screw with another type of serrated prongs.
Figure 5C:
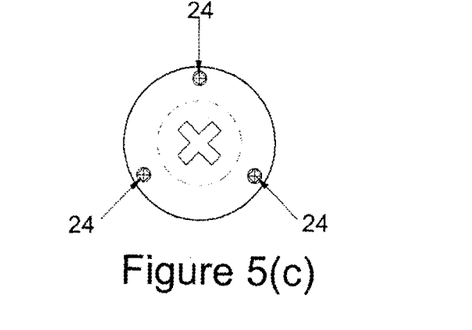
FIG. 5(c) is a top plan view of FIG. 5(b).
Figure 6A:
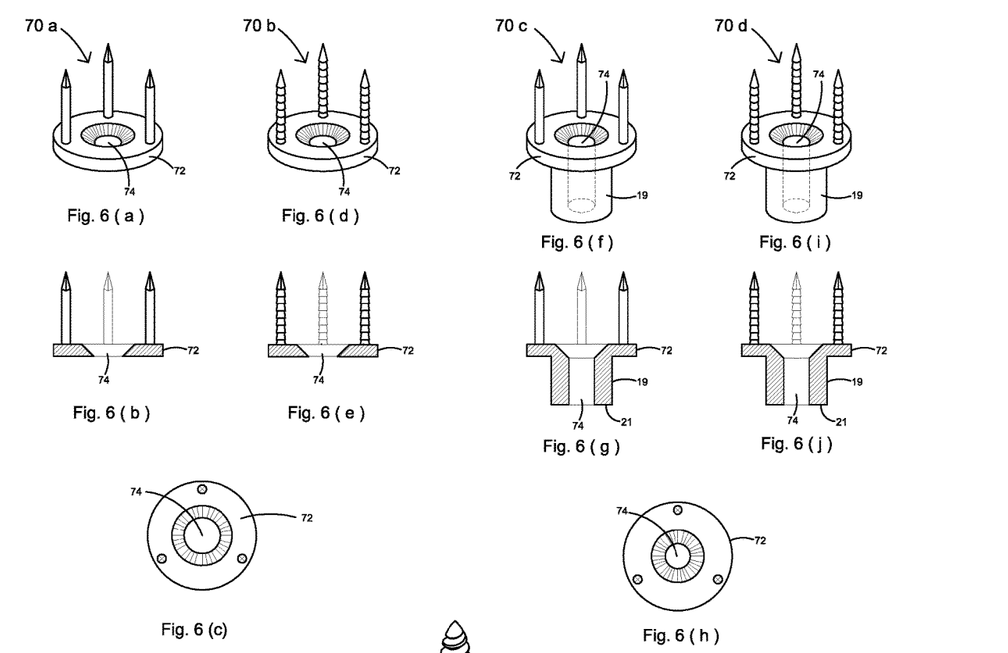
FIG. 6(a) is a perspective view of a first fastener extension.

FIGS. 5a-c shows further embodiments 10e and 10f of the fastener comprising serrated prongs 24 which extend parallel and in a direction opposite to the shank 12. Research of the leading builders found the use of building materials which varies significantly in density, and as such product development has lead to serrated fixing prongs 24 (which are stronger and do not skew) being developed.

Product testing shows that the integrated fixing prongs 24 of the fastener 10 (which gave been designed to skew and curl into the soft pine timber) cannot penetrate the dense MDF (Medium Density Fibreboard), and therefore did not provide any bite nor grip.

The serrated fixing prongs 24 of the fasteners 10e and 10f are pin shaped to provide easier penetration of the dense MDF material. Product development has also lead to variations of the serrations on the prongs for maple/meranti timber (FIG. 5(a)) and MDF (FIG. 5(b)).

The variation in FIG. 5(b) is the incorporation of 50% leading smooth pin 25 that penetrates easier into the dense MDF and 50% serrations, and with fewer serrations, provides less resistance requiring less force for penetration into the dense MDF material.

In other embodiments, the serrated prongs can also be slightly splayed, and can be adapted to curl outwardly similar to the prongs above.

In other embodiments, the fastener can be a nail or an anchor bolt such as a DYNABOLT™.

The fastener of the preferred embodiment thus provides two-directional concealed fixing via a threaded shank in one direction, and integrated fixing prongs in the opposite direction. The preferred fastener has integrated fixing prongs incorporated on the screw head that are designed to bite, skew and curl into pre-finished timber. The preferred fastener has the integrated fixing prongs that provide a skewing and curling action locking the pre-finished timber towards the screw head. The integrated fixing prongs can generate a gripping a force greater than that of single trimming nails through the timber.

The preferred fastener can comprise a varying number of integrated fixing prongs in the screw head. The preferred fastener has a shoulder that provides a depth gauge to ensure all integrated fixing prongs protrude past the face of the plasterboard wall lining equidistantly. The preferred fastener can accommodate any variation of drive system within the head. The preferred fastener provides fixing from the back face of the material, and without penetrating the surface, allows for pre-finished timber to be used.

The preferred fastener provides concealed fixing as an alternative to the current nailing of internal timbers. This has been achieved with the threaded shank providing gripping to the wall frame, and the integral fixing prongs providing bite and penetration to pull the timber towards the crown, which provides for a very strong connection. The fixing prongs are an integral part of the screw head giving the screw head a crown like appearance.

The preferred screw is driven to the wall frame with the shoulder providing the pre-determined bearing depth, ensuring correct engagement of the crown. The timber is positioned for fastening, with pressure being applied to the face of the timber, engaging the fixing prongs which bite into the timber. As more pressure is applied and the timber is forced home, the fixing prongs skew and curl into the timber which provides a powerful locking strength.

The fixing detail is such that the fasteners are secured to each stud frame via the threaded shank, with the shoulder of the fastener providing the bearing surface to ensure all screw heads are set at the same depth, thus providing consistent bite force to the timber skirting. The fixing prongs in the set position, protrude forward of the face of the Plasterboard Wall Lining, and have been designed to bite and skew into the timber Skirting, curling and pulling the pre-finished timber tight with the Plasterboard Wall Lining. The result is that the skirting remains a tight fit along the entire length of wall, thus minimising (or eliminating) the need for gap filler.

The fastener has the potential to change the current construction method of nailing through the timber surface, and allows the opportunity to provide the highest quality of finishes, all without compromising the construction costs nor the build time.

FIGS. 6a-i show fastener extensions 70a to 70d in accordance with another aspect. Each fastener extension 70 comprises a body 72 having a central aperture 74 through which a normal fastener (e.g. screw, nail or bolt) can extend through. The aperture 74 is shaped as a recess for receiving a head of the normal fastener in a tight fit thereto. The attachment means of the normal fastener will extend in a first direction, being a downward direction in the drawings. The body 72 of each fastener comprises a second attachment means, which in the embodiment are three prongs each, having smooth surfaces or serrated surfaces. The second attachment means extend in the opposite direction, being upward in the drawings.

Figure 7:
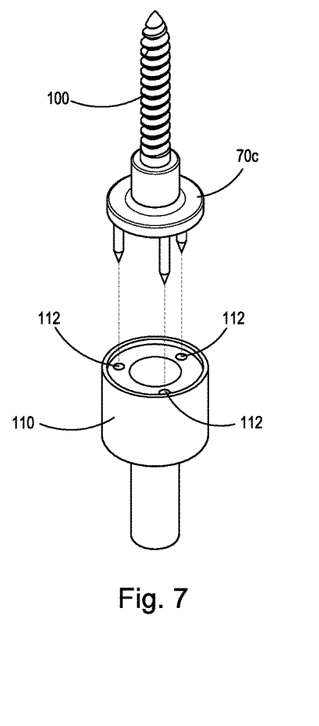
FIG. 7 shows perspective view of a drive tool for the fasteners and fastener extension, and a fastener received in the fastener head extension of FIG. 6(f).

As shown in FIG. 7, the fastener extensions 70 can be added to normal fasteners 100 and provide them with additional oppositely directed attachment means. The bodies 72 of fasteners 70a and 70b are shaped as generally flat washers whist the bodies 72 of the fasteners 70c and 70d are shaped to include the cylindrical shoulder 19 and stop surface 21 as per the fasteners above.

FIG. 7 also shows a drive tool 110 for the fasteners and fastener extensions. The drive tool 110 is shaped as a socket having three cavities 112 for respectively receiving the prongs of the fasteners or fastener extensions, such that the tool 110 can rotate and drive them.

Whilst preferred embodiments of the present invention have been described, it will be apparent to skilled persons that modifications can be made to the embodiments described.

I claim:

1. A fastener, comprising:
a shank having a first attachment means to a first workpiece;
a head having a second attachment means to a second workpiece; and
a cylindrical shoulder between said shank and said head, said cylindrical shoulder being larger than said shank so as to form a stop surface, said stop surface setting a depth of insertion of said shank, said head being larger than said cylindrical shoulder,
wherein a distance between said head and said depth of insertion is constant,
wherein the second attachment means comprises at least one attachment member formed on said head, said at least one attachment member extending in a direction from said head opposite to said shank,
wherein said head having a peripheral portion and a central portion and being comprised of a drive formation, said at least one attachment member being laterally spaced from said drive formation, and
wherein the second attachment means further comprises at least another attachment member, said at least one attachment member and said at least another attachment member being equidistantly spaced around said peripheral portion.

2. The fastener, according to claim 1, wherein the first attachment means is a thread formation on said shank.

3. The fastener, according to claim 1, said at least one attachment member and said at least another attachment member are comprised of prongs, each prong being splayed relative to each other.

4. The fastener, according to claim 3, wherein each prong has a curl configuration when forced into the second workpiece.

5. A fastener system, comprising:
a shank having a first attachment means to a first workpiece;
a head having a second attachment means to a second workpiece, said second workpiece having a front surface and a rear surface;
a shoulder between said shank and said head, said shoulder being cylindrical and larger than said shank so as to form a first stop surface, said head being larger than said shoulder so as to form a second stop surface; and
a third workpiece being between said first workpiece and said second workpiece and mounted between said first stop surface and said second stop surface of said shoulder,
wherein a distance between said head and a depth of insertion is constant, and
wherein said second workpiece is fixed adjacent to said third workpiece by said second attachment means, said second attachment means extending through said rear surface and into said second workpiece so as to be housed within said second workpiece, said second attachment means being positioned between said front surface said second stop surface.

6. The fastener system, according to claim 5, wherein the first attachment means is a thread formation on said shank.

7. The fastener system, according to claim 5, wherein the second attachment means comprises at least one attachment member formed on said head, said at least one attachment member extending in a direction from said head opposite to said shank.

8. The fastener system, according to claim 7, wherein said head having a peripheral portion and a central portion and being comprised of a drive formation, said at least one attachment member being laterally spaced from said drive formation.

9. The fastener system, according to claim 8, wherein the second attachment means further comprises at least another attachment member, said at least one attachment member and said at least another attachment member being equidistantly spaced around said peripheral portion.

10. The fastener system, according to claim 9, wherein said at least one attachment member and said at least another attachment member are comprised of prongs, each prong being splayed relative to each other.

11. The fastener system, according to claim 10, wherein each prong has a curl configuration when forced into the second workpiece.

* * * * *